United States Patent
Meskar (10) Patent No.: US 10,618,758 B2
(45) Date of Patent: Apr. 14, 2020

(54) DOUBLE-ENDLESS-BELT CONVEYOR, TURNOVER MODULE INCORPORATING SUCH A CONVEYOR AND FOLDING PACKAGE PRODUCTION LINE INCORPORATING SUCH A MODULE

(71) Applicant: BOBST MEX SA, Mex (CH)

(72) Inventor: Ketan Meskar, Chinchwad Pune (IN)

(73) Assignee: BOBST MEX SA, Mex (CH)

( * ) Notice: Subject to any disclaimer, the term of this patent is extended or adjusted under 35 U.S.C. 154(b) by 0 days.

(21) Appl. No.: 16/317,286

(22) PCT Filed: Jun. 20, 2017

(86) PCT No.: PCT/EP2017/025169
§ 371 (c)(1),
(2) Date: Jan. 11, 2019

(87) PCT Pub. No.: WO2018/007016
PCT Pub. Date: Jan. 11, 2018

(65) Prior Publication Data
US 2019/0300308 A1  Oct. 3, 2019

(30) Foreign Application Priority Data

Jul. 5, 2016  (IN) .............................. 201641023047

(51) Int. Cl.
B65H 29/12 (2006.01)
B65H 33/12 (2006.01)
(Continued)

(52) U.S. Cl.
CPC ............. B65H 5/023 (2013.01); B65G 15/14 (2013.01); B65G 15/16 (2013.01); B65H 7/00 (2013.01);
(Continued)

(58) Field of Classification Search
CPC .. B65G 2812/018; B65G 15/14; B65G 15/16; B65G 15/18
(Continued)

(56) References Cited

U.S. PATENT DOCUMENTS 2,376,494 A * 5/1945 Larabee ................ B29D 30/52
100/153
2,805,762 A * 9/1957 Kampfer ................ B65G 37/00
198/626.6
(Continued)

FOREIGN PATENT DOCUMENTS

| DE | 28 22 827 A1 | 11/1978 |
|----|--------------|---------|
| EP | 0 654 434 A1 | 5/1995 |
| EP | 2 392 451 A2 | 12/2011 |
| WO | 2013063701 A1 | 5/2013 |

OTHER PUBLICATIONS

International Search Report issued in PCT/EP2017/025169, Sep. 29, 2017 (dated Oct. 10, 2017), 2 pages.

*Primary Examiner* — James R Bidwell
(74) *Attorney, Agent, or Firm* — Bookoff McAndrews, PLLC (57) ABSTRACT

The conveyor comprises two single-transport-belt conveyor subassemblies (42AL, 42AH) arranged facing each other symmetrically relative to a pinching plane of the conveyor (42A), two sets of rollers (423L, 423H) incorporated in the two conveyor subassemblies and distributed on either side of the pinching plane. A first set of rollers (423L) guides a belt (420AL) of the first conveyor subassembly and a second set of rollers (423H) guides a belt (420AH) of the second conveyor subassembly. The conveyor subassemblies comprise sets of vertically arranged jacks (424L, 424H) which are associated with the sets of rollers, each of the rollers being mounted on a dedicated respective jack.

9 Claims, 5 Drawing Sheets

(51) Int. Cl.
*B65G 15/16* (2006.01)
*B65G 15/14* (2006.01)
*B65H 5/02* (2006.01)
*B65H 29/66* (2006.01)
*B65H 7/00* (2006.01)

(52) U.S. Cl.
CPC ......... *B65H 29/12* (2013.01); *B65H 29/6663* (2013.01); *B65H 33/12* (2013.01); *B65H 2301/42112* (2013.01); *B65H 2402/10* (2013.01); *B65H 2404/25* (2013.01); *B65H 2404/2614* (2013.01); *B65H 2404/2615* (2013.01); *B65H 2515/10* (2013.01); *B65H 2515/34* (2013.01); *B65H 2701/1766* (2013.01)

(58) Field of Classification Search
USPC .......................................... 198/626.3, 626.4
See application file for complete search history.

(56) References Cited

U.S. PATENT DOCUMENTS

| | | | | |
|---|---|---|---|---|
| 3,143,269 | A | * | 8/1964 | Van Eldik ............. B65G 37/00 226/172 |
| 3,170,564 | A | * | 2/1965 | Gatto ..................... B21C 35/02 198/626.5 |
| 3,399,755 | A | * | 9/1968 | Bryson .................. B42C 19/08 198/460.1 |
| 4,076,231 | A | * | 2/1978 | Kutzner ................. B41F 13/58 270/52.17 |
| 4,204,672 | A | | 5/1980 | Grivet |
| 5,331,874 | A | * | 7/1994 | Foster ..................... B26D 3/11 198/626.6 |
| 5,542,349 | A | | 8/1996 | Gosslinghoff |
| 5,875,697 | A | * | 3/1999 | Cole ..................... B65G 15/14 198/626.4 |

\* cited by examiner

DOUBLE-ENDLESS-BELT CONVEYOR, TURNOVER MODULE INCORPORATING SUCH A CONVEYOR AND FOLDING PACKAGE PRODUCTION LINE INCORPORATING SUCH A MODULE

CROSS-REFERENCE TO RELATED APPLICATION(S)

This application is a National Stage under 35 U.S.C. § 371 of International Application No. PCT/EP2017/025169, filed on Jun. 20, 2017, which claims priority to Indian Patent Application No. 201641023047, filed on Jul. 5, 2016, the contents of all of which are incorporated by reference in their entirety.

The present invention is applicable generally to the field of the packaging industry. More particularly, the invention relates to a double-endless-belt conveyor that can be in a module for turning over shingle stream of folding packages such as shingle steams of folding boxes. The invention relates also to a folding package production line in which such a turnover module is incorporated.

Figure 1:
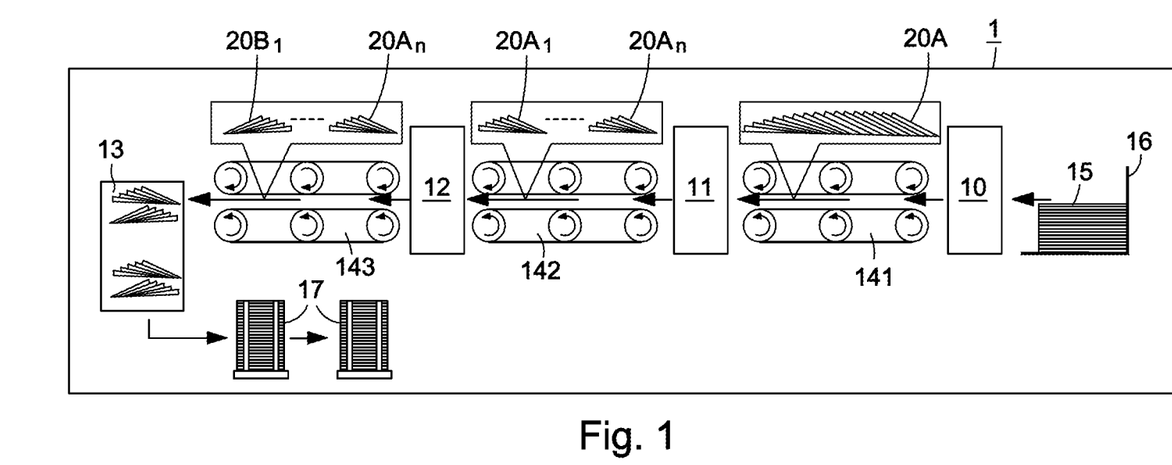
FIG. 1 shows, in simplified form, a folding box production line.
Figure 2A:
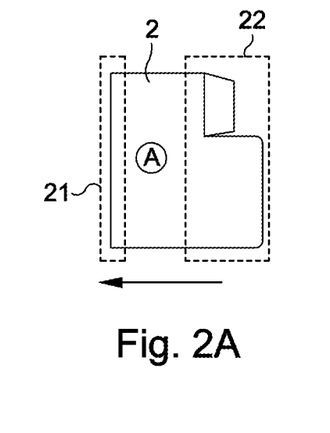
FIGS. 2A and 2B show, in plan view, folding boxes in flat configuration in normal and turned-over arrangements.
Figure 2B:
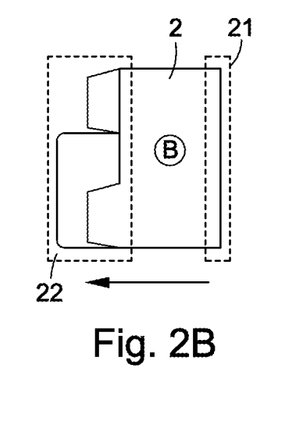

Referring to FIGS. 1, 2A and 2B, a general configuration of a folding box production line according to the prior art is described below in a simplified manner. As shown in FIG. 1, a production line 1 of the prior art comprises a folding-gluing machine 10, a counting-segmentation module 11, a turnover module 12, a packing module 13 and motorized transport conveyors 141, 142 and 143.

At the inlet of the production line 1, blanks 15, for example of flat cardboard or corrugated cardboard, are stacked in a bin 16 which is regularly topped up. These blanks 15 are inserted and processed successively in the folding-gluing machine 10. The machine 10 performs folding and gluing operations so as to obtain a folding box in flat configuration such as the box 2 shown in FIG. 2A. The folding box 2 of FIG. 2A is shown in plan view according to an arrangement A.

The folding boxes 2 are delivered in a continuous stream at the outlet of the folding-gluing machine 10, in the form of a shingle stream 20A of folding boxes 2 in flat configuration. The arrangement of the boxes 2 in the continuous shingle stream 20A is the arrangement A shown in FIG. 2A. The arrow represented in FIG. 2A indicates the direction of transport of the boxes 2 in the production line 1.

The continuous shingle stream 20A is transported by the motorized conveyor 141 to the counting-segmentation module 11. The conveyor 141, just like the conveyors 142 and 143, transports the folding boxes 2 into a pinching zone between two endless transport belts. As is known, these transport belts of the conveyors 141, 142 and 143 are supported by rollers and tensioned by means of tensioning devices.

In these folding box production lines, there is the problem of the packing of the boxes in a container or of the palletization thereof.

These folding boxes 2 generally have a non-uniform thickness. Thus, a part 21 of the folding box 2 shown in FIG. 2A here has a thickness very much greater than that of another part 22 of the box 2. It follows therefrom that a packing in a container directly from the continuous shingle stream 20A delivered by the conveyor 141 would inevitably lead to a poor optimization of the filling of the packing container.

Palletization cannot be considered from the continuous shingle stream 20A, because the verticality of the stack of folding boxes 2 on the pallet cannot be assured. This verticality defect introduces an instability and difficulties in binding the stack of boxes on the pallet.

One solution known from the prior art for solving the packing problem explained above involves the use of two successive additional operations performed in the production line 1.

The first operation consists in breaking the continuity of the shingle stream 20A by segmenting it into different shingle stream portions $20A_1$ to $20A_n$ spaced apart from one another, as shown in FIG. 1. The shingle stream portions $20A_n$ are each formed of a certain number of folding boxes 2. This operation is performed by the counting-segmentation module 11. In FIG. 1, the folding boxes 2 at the outlet of the module 11 remain in the arrangement A of FIG. 2A.

The next additional operation consists in turning over one shingle stream portion in every two by 180 degrees. This operation is performed by the turnover module 12. The module 12 delivers at its outlet a succession of shingle stream portions which are immediately stacked into bundles $20B_1, 20A_2, 20B_3 \ldots 20A_n$, at the inlet of the transport conveyor 143, as shown in FIG. 1. The bundles $20B_n$ are bundles turned over by 180 degrees and, by virtue of the turning over thereof, exhibit the arrangement B shown in FIG. 2B.

The flow of bundles delivered by the turnover module 12 is transported to the packing module 13. The turning over of one shingle stream portion in every two makes it possible to compensate for the difference in thickness between the parts 21 and 22 of the folding boxes 2. The packing module 13 is then able to ensure an optimal packing of the folding boxes 2. FIG. 1 here shows a packing in the form of palletized stacks 17 of folding boxes.

The second operation, that of the turning over of one shingle stream portion in every two is that of the two operations which proves to be the more critical and difficult for the packaging manufacturers, because the risk of damage to the folding boxes and scrap during this turnover operation is significant.

A turnover module of the prior art is known that comprises a bridge frame supporting a rotary turnover structure, also called pivoting cradle, which is housed between two vertical pillars of the frame. These pillars rest on a factory floor and the turnover structure housed between them comprises two turnover conveyors. These two conveyors each comprise two transport belts mounted on rollers which define between them a pinching zone for driving the shingle stream portion of folding boxes in transit. The two conveyors have a similar architecture and are arranged facing each other, at a certain distance from one another, on two respective parallel vertical planes. Their respective pinching zones are situated in one and the same horizontal pinching plane which, when the turnover module is in the idle position, that is to say, not running, is in alignment with the planes of the inlet 142 and outlet 143 conveyors of the production line. The turnover structure comprises a horizontal axis of rotation defined between the two vertical pillars. This axis of rotation passes through the pinching plane of the conveyors of the turnover structure and is at right angles to the vertical planes thereof and to the direction of transport of the shingle stream portions.

The operation of this prior art module breaks down into a number of steps. In a first step, with the turnover structure in the idle position, that is to say not running and with its pinching plane in alignment with the plane of transport of the shingle stream portions at the inlet and at the outlet of the module, the incoming shingle stream portion is inserted into the pinching plane of the turnover structure. The insertion of the shingle stream portion into the pinching plane is ensured by the moving transport belts of the conveyors of the turnover structure. The inserted shingle stream portion is immediately discharged without being turned over by the still-moving belts of the conveyors of the turnover structure.

In a second step, the belts of the conveyors of the turnover structure are stopped and the inserted shingle stream portion remains immobilized in the pinching plane. The turnover structure then performs a rotation of 180 degrees and, once the latter has returned to an idle position, the belts of the conveyors are started up again and discharge the turned-over shingle stream portion out of the turnover module.

In the turnover structure, the transport belts of the conveyors are guided by rollers. Jacks act on these rollers so as to exert a pressure on the shingle stream portions of folding boxes. The aim of this pressure is to ensure the positioning of the shingle stream portions of folding boxes during their period of transit in the turnover structure and to obtain a good regularity of the flow of transported shingle stream portions. The pressure exerted on the folding boxes also helps in the correct finalization of the gluing operations performed on these boxes, by keeping the parts to be secured in position. The optimal adjustment of the pressure exerted in the double-belt conveyors of the turnover structure is a difficulty because different stresses have to be taken into account. A compromise has to be found between a pressure of sufficient value to ensure the functions described above and a pressure maximum not to be exceeded at the risk otherwise of damaging the surface condition of the folding boxes and increasing the rate of scrap. The product packaging folding boxes must these days have an outer appearance of high quality and often have printed surfaces and elaborate screen prints.

Figure 5:
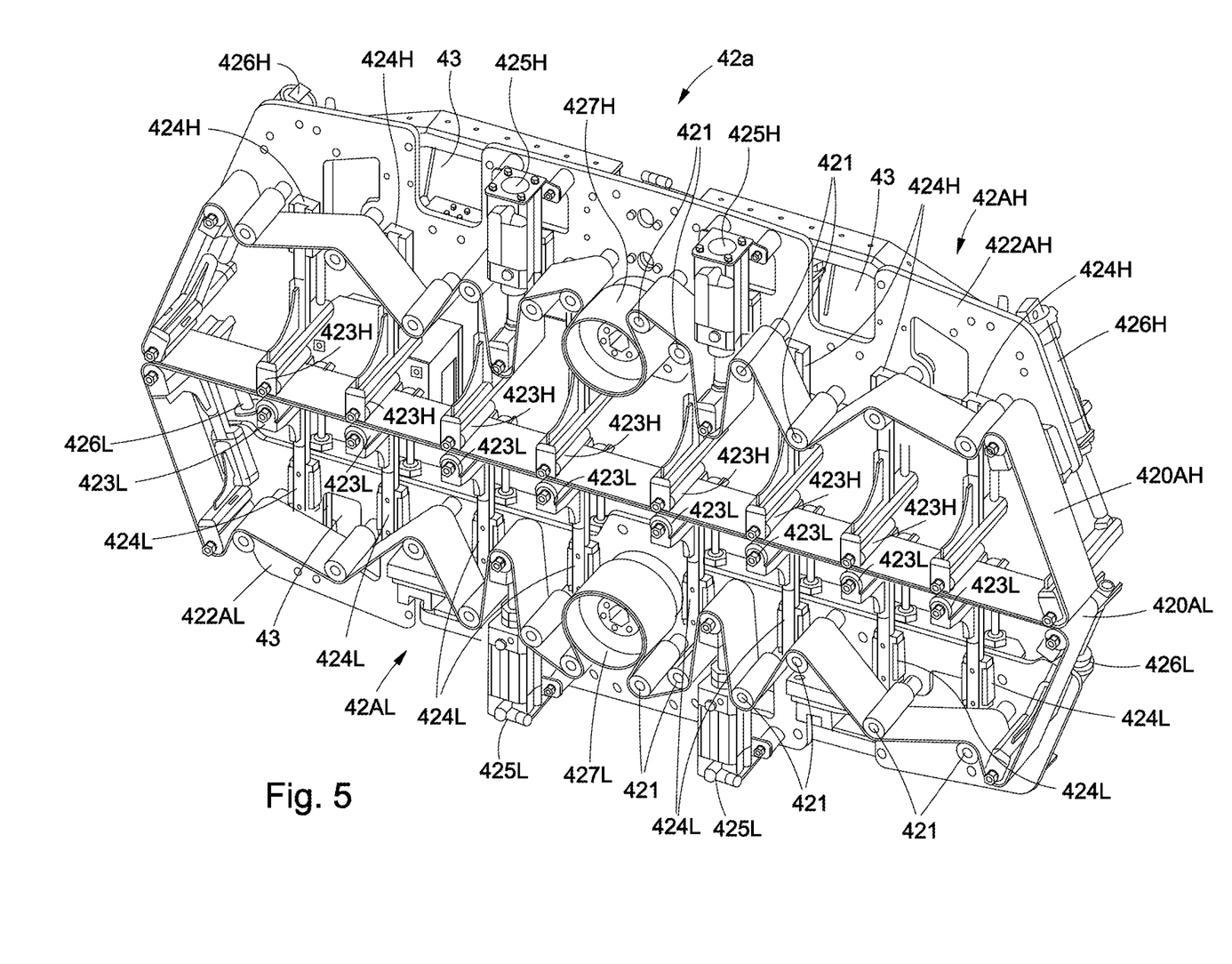
FIG. 5 is a perspective view of a double-belt conveyor included in a turnover structure of the module of FIG. 3.
Figure 5A:
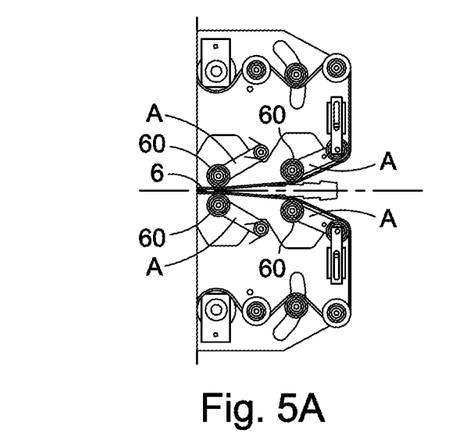
FIG. 5A shows, in simplified form, the architecture of a double-belt conveyor of the prior art.

The conveyors included in the turnover structure of the module of the known prior art have an architecture of the type of that shown in FIG. 5A. In this architecture, rollers provided for guiding and securing the shingle stream portions of folding boxes in the pinching zone 6 are supported by shafts A that are inclined relative to the vertical. This inclination of the shafts is not identical over the entire length of transport in the conveyor. In effect, the inclination thereof is reversed on the symmetrical part (not represented) of the conveyor of FIG. 5A. Consequently, if it is considered that, in such a conveyor, the angle of inclination chosen can be adapted to achieve a certain quality of transport of the shingle stream portions in the conveyor, this quality of transport will be able to be obtained only over half the length of transport ensured by the conveyor. The lower reference is not set.

SUMMARY OF THE INVENTION

The aim of the present invention is to provide solutions to the drawbacks explained above of the prior art by proposing a novel architecture for a double-belt conveyor which can be incorporated in a folding package turnover module to help reduce the rate of scrap during the turnover operations and reduce the operation time.

According to a first aspect, the present invention relates to a double-transport-belt conveyor that can be incorporated in a folding package turnover module, which comprises first and second single-transport-belt conveyor subassemblies arranged facing each other symmetrically relative to a pinching plane of the conveyor, first and second sets of rollers incorporated respectively in the first and second conveyor subassemblies and distributed on either side of the pinching plane over a length of transport of the conveyor, with the first set of rollers guiding a first belt of the first conveyor subassembly and the second set of rollers guiding a second belt of the second conveyor subassembly.

According to the invention, the first and second conveyor subassemblies respectively comprise first and second sets of vertically arranged jacks which are associated respectively with the first and second sets of rollers, with each of the rollers which is mounted on a dedicated respective jack.

According to a particular feature of the invention, adjustable and different pressures are applied, at the level of the pinching plane, to the first and second belts respectively by the first and second sets of rollers and dedicated vertical jacks. These adjustable and different pressures can be switched over upon the rotation of the turnover module.

According to another particular feature of the invention, the pressure applied to the belt of the conveyor subassembly situated in a low position is greater than the pressure applied to the belt of the conveyor subassembly situated in a high position. This pressure applied to the belt in low position makes it possible to guarantee a constant level of the passage of the sheets.

According to yet another particular feature of the invention, the pressure applied to the belt of the conveyor subassembly situated in a low position is adjusted according to the weight of the folding packages traveling in the conveyor.

According to yet another particular feature of the invention, the pressure applied to the belt of the conveyor subassembly situated in a high position is optimized to the minimum to ensure an adequate securing of the folding packages without the risk of damage to the surface thereof.

According to a particular embodiment of the invention, the vertically arranged dedicated jacks are pneumatic jacks.

According to another aspect, the present invention relates to a folding package turnover module that can be incorporated in a folding package production line, comprising a frame having first and second vertical pillars, and a rotary turnover structure arranged horizontally between the vertical pillars. According to the present invention, the rotary turnover structure comprises at least one double-belt conveyor according to the invention as briefly described above, the conveyor being arranged vertically.

According to another embodiment, the rotary turnover structure of the turnover module comprises at least two double-belt conveyors according to the invention as briefly described above, the conveyors being arranged vertically and means for adjusting distance between two respective vertical planes of the conveyors being provided in the turnover structure.

According to yet another embodiment, the turnover module comprises first and second motors dedicated respectively to rotationally driving the turnover structure and to driving the belts of the conveyor subassemblies included in a conveyor according to the invention as briefly described above.

According to yet another embodiment, the turnover module comprises additional means comprising at least one pulley, at least one distribution belt and at least one transmission rod for mechanically coupling the second motor to driving drums of the belts of the conveyor subassemblies included in a conveyor according to the invention as briefly described above.

According to yet another aspect, the invention relates to a folding package production line comprising a folding-gluing machine, a counting-segmentation module, a turnover module and a set of conveyors, in which the turnover module is a module for turning over folding packages according to the invention as briefly described above.

BRIEF DESCRIPTION OF THE DRAWINGS

Other advantages and features of the present invention will become more clearly apparent on reading the following description of several particular embodiments with reference to the attached drawings, in which.

EXEMPLARY EMBODIMENTS OF THE INVENTION

Figure 3:
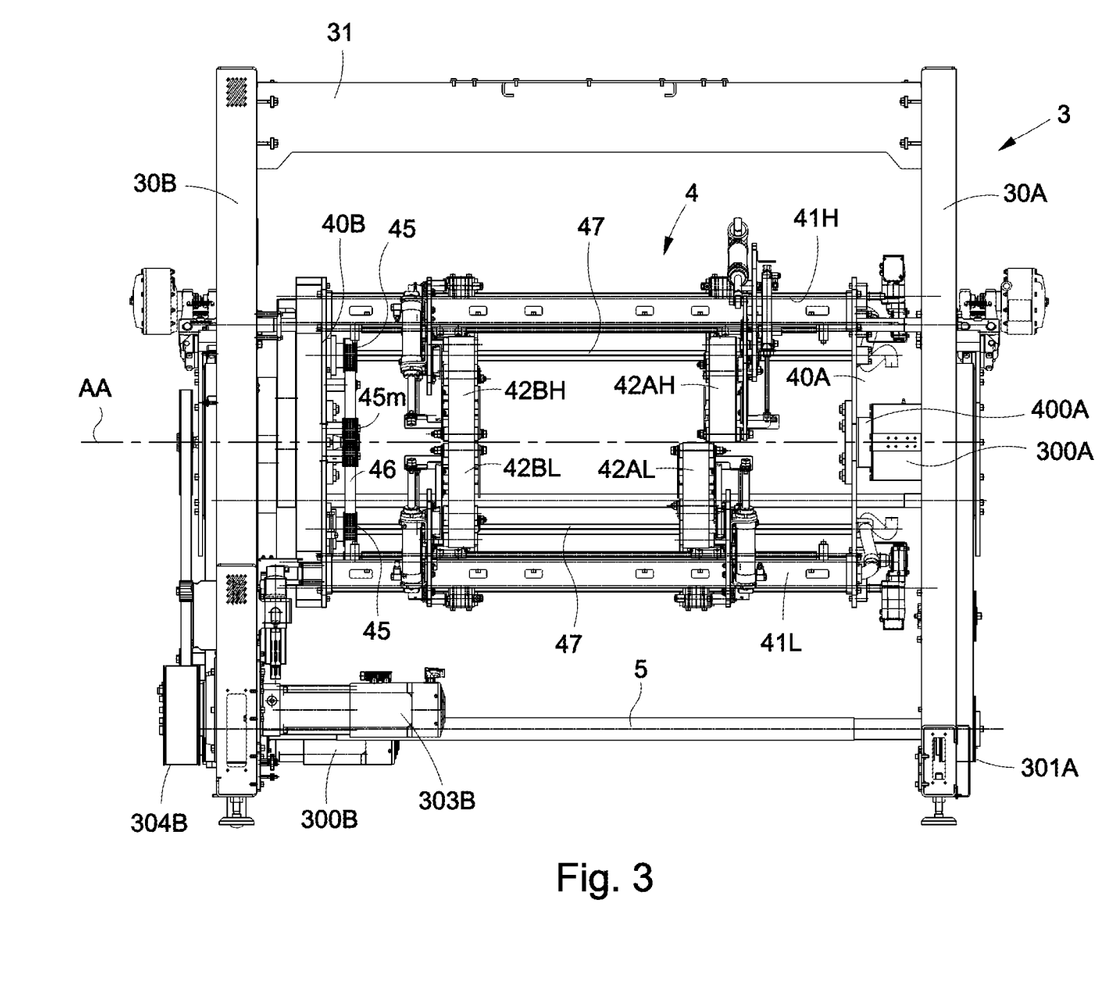
FIG. 3 is a front view of a turnover module according to a particular embodiment of the invention.
Figure 4A:
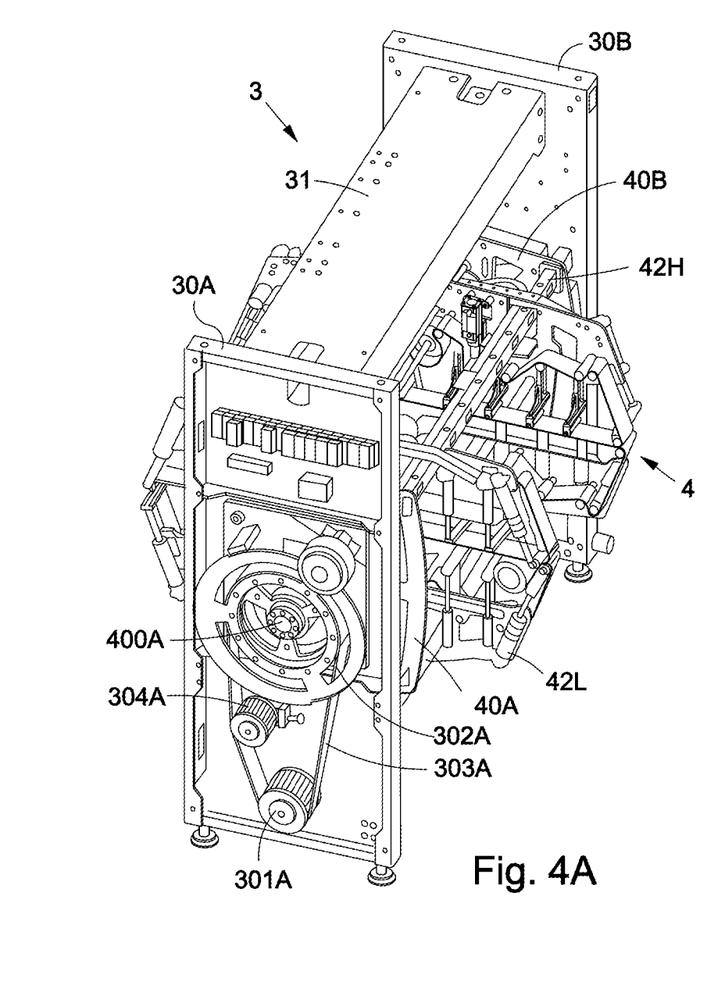
FIGS. 4A and 4B are front and rear perspective views of the turnover module of FIG. 3.
Figure 4B:
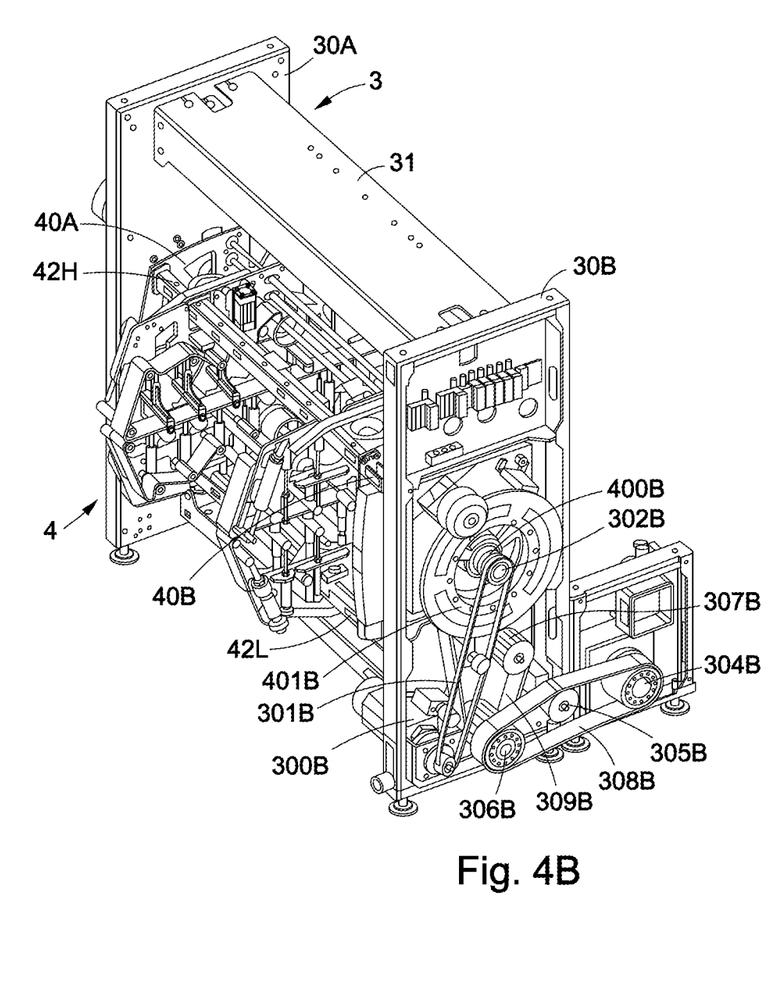

Referring mainly to FIGS. 3, 4A and 4B, the general architecture of a particular embodiment of a turnover module according to the invention is first of all described hereinbelow.

The turnover module 3 essentially comprises a bridge frame formed by a front pillar 30A, a rear pillar 30B and a high transverse beam 31, and a turnover structure 4.

The front 30A and rear 30B pillars are arranged vertically and are mechanically joined in their high parts to ends of the horizontally arranged transverse high beam 31. The pillars 30A, 30B, comprise low parts forming level-adjustable supporting bases that can rest on a factory floor. The duly formed bridge frame is leveled in a conventional manner.

The turnover structure 4 is mounted horizontally between the two pillars 30A and 30B. The structure 4 comprises front 40A and rear 40B cradle plates arranged in parallel vertical planes and assembled by means of four transverse bars 41H, 41L and 42H, 42L mounted horizontally. The bars 41H, 41L, 42H, 42L are fixed at their ends onto fixing flanges (not represented) of the cradle plates 40A, 40B. These flanges are positioned in a rectangle on the cradle plates 40A, 40B.

The cradle plates 40A, 40B comprise, in central parts, respective rotation shafts 400A, 400B. These rotation shafts 400A, 400B are inserted into through-bearings with which the front and rear pillars 30A, 30B are equipped, respectively. The through-bearing receiving the shaft 400A can be seen in FIG. 3 and is referenced 300A.

The rotation shafts 400A, 400B and the corresponding bearings (300A) are aligned on the horizontal axis of rotation AA, shown in FIG. 3, of the module 3. The axis of rotation AA is at right angles to the front and rear pillars 30A, 30B, is contained in the pinching plane of the folding boxes inside the turnover structure 4 and is at right angles to the direction of transport of the folding boxes entering into the turnover module 3 or leaving therefrom.

Referring also to FIG. 5, two double conveyors 42A and 42B are now described, each simply designated by the term "double conveyor" hereinbelow, which are mounted in the turnover structure 4.

In other embodiments of the invention, the proposed combination of two conveyors 42A, 42B can be replaced by a single conveyor having extra-wide transport belts.

The double conveyors 42A and 42B each comprise two single-belt conveyors 42AH, 42AL and 42BH, 42BL, each designated by the term "conveyor subassembly" hereinbelow. The conveyor subassemblies 42AH and 42BH are mounted in the high part of the turnover structure 4 and are supported by the high parallel transverse bars 41H and 42H. The conveyor subassemblies 42AL and 42BL are mounted in the low part of the turnover structure and are supported by the low parallel transverse bars 41L and 42L.

As shown in FIG. 5 for the conveyor 42A, the conveyor subassemblies 42AH and 42AL comprise voids 43 for their insertion into the transverse bars 41H, 42H and 41L, 42L, respectively, and for their individual sliding thereon. The conveyor subassembly 42B has a similar configuration to that of the conveyor subassembly 42A.

The sliding of the conveyor subassemblies onto the transverse bars of the cradle allows an adjustment of their separation in order to configure the module for different folding box dimensions, for example, or according to parameters linked to the operation of the production line.

FIG. 3 shows a vertical alignment offset between the conveyors 42AH and 42AL. In this FIG. 3, it is a question of a representation during adjustment to show here the possibility that exists in the turnover module according to the invention of individually slidingly positioning each of the conveyor subassemblies 42AH, 42AL, 42BH, 42BL on their respective transverse bars. Once the positioning adjustment operation is finished, the conveyor subassemblies 42AH, 42AL (42BH, 42BL) forming the conveyor 42A (42B) are immobilized on the transverse bars and are aligned in one and the same vertical plane.

As emerges clearly in FIG. 5 for the conveyor 42A, each conveyor subassembly 42AH, 42AL comprises an endless transport belt 420AH, 420AL, respectively.

Each conveyor 42AH, 42AL comprises a first set of loose rollers 421 mounted on shafts fixed onto a plate 422AH, 422AL, and ensuring the guiding of the belts 420AH, 420AL, respectively.

Each conveyor subassembly 42AH, 42AL also comprises a second set of loose rollers 423H, 423L supported by a set of dedicated jacks 424H, 424L fixed onto the plates 422AH, 422AL, respectively. In this embodiment of the invention, eight high jacks 424H and eight low jacks 424L are provided. Obviously, their numbers will depend on the different possible applications of the turnover module according to the invention.

In accordance with the invention, the axes of the jacks 424H, 424L are vertical and therefore control vertical displacements of the sets of loose rollers 423H, 423L. This feature of vertical arrangement of the jacks 424H, 424L greatly simplifies the control of the pinching zone between the belts 420AH and 420AL facing each other. It is thus possible to control the pinching force between the belts according to the thickness of the shingle stream portions of folding boxes and the type of boxes to be processed, by a simple adjustment of the pneumatic pressure applied to the jacks. Furthermore, very advantageously, the flatness of the transport plane in the pinching zone, ensured by the low band 420AL (in the position of the conveyor subassemblies of FIG. 5) can be guaranteed by applying a stronger and adjustable pressure to the low jacks 424L when a greater weight of the shingle stream portions of folding boxes in transit has to be supported for example. The pressure applied to the high jacks 424H, in accordance with the invention, will be able to be lower than that applied to the low jacks 424L. In effect, the upper belt 420AH (still in the position of the conveyor subassemblies of FIG. 5) does not have to support the weight of the shingle stream portions of folding boxes in transit and the pressure of the high jacks 424H can be optimized to the minimum to ensure a sufficient hold on the shingle stream portions of folding boxes without risking damage to the surface of the boxes and an increase in the rate of scrap. Obviously, according to the invention, the values of the pressures applied to the jacks 424H and 424L will be able to be switched over according to the position of the turnover structure 4, since the latter is required to perform rotations of 180 degrees. It is thus possible to retain, in different positions of the turnover structure 4, the differentiation described above between the pressures applied to the shingle stream portions by the transport belt situated in the low position and that situated in the high position.

As can also be seen in FIG. 5, each conveyor subassembly 42AH, 42AL further comprises two vertical jacks 425H, 425L and jacks 426H, 426L mounted with inclination, respectively. These jacks are fixed onto the plates 422AH and 422AL and support loose rollers in contact with the endless transport belts 420AH, 420AL. Their function is to tension the transport belts. The vertical jacks 425H, 425L guarantee a sufficiently high tension of the belts 420AH, 420AL on either side of a belt driving drum 427H, 427L provided in the conveyor subassemblies 42AH, 42AL, respectively. The jacks 426H, 426L mounted with inclination ensure an appropriate pinching between belts at the ends of the pinching zone between the belts 420H, 420L facing each other.

The mechanical architecture described above for the conveyors 42A, 42B and proposed in the present invention provides an optimization of the transfer and of the holding of the shingle stream portions of folding boxes in the turnover structure of the module, which optimization helps to significantly reduce the folding box scrap rate.

The rotational driving of the belts of the conveyors 42A, 42B is now described in detail hereinbelow with reference more particular to FIGS. 4B, 3, 5 and 6.

Figure 6:
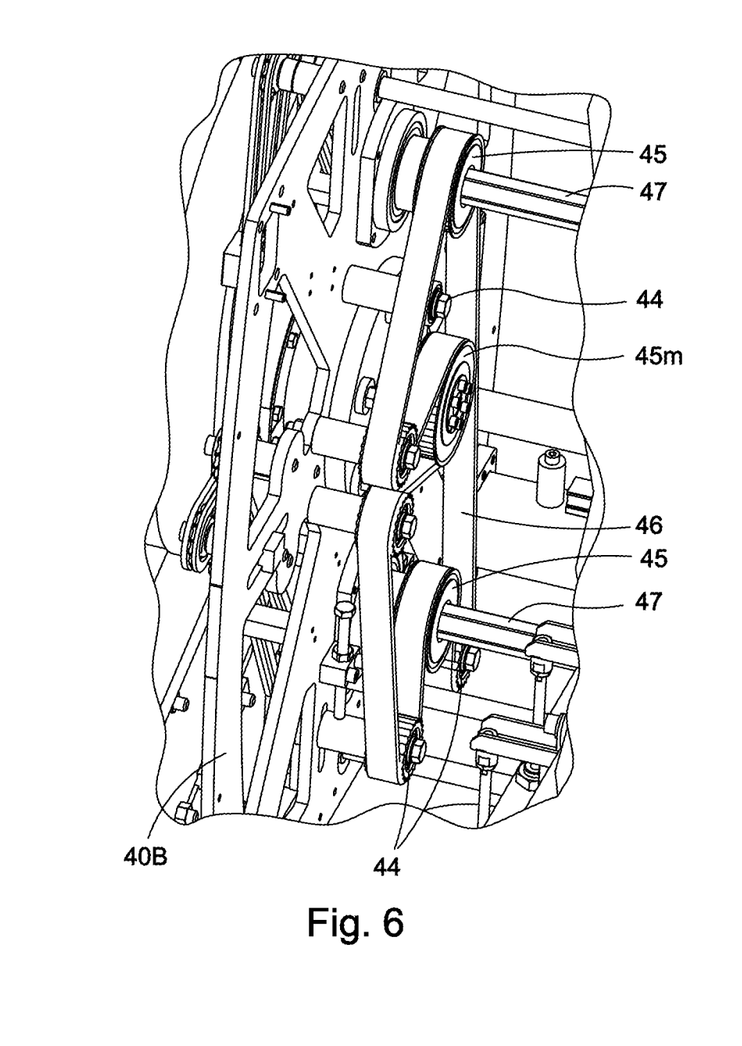
FIG. 6 is a partial perspective view showing a mechanism for rotationally driving conveyors incorporated in the module of FIG. 3.

As appears clearly in FIG. 6, the turnover structure 4 is equipped with a belt driving mechanism which is fixed onto the front cradle plate 40B and comprises loose toothed pulleys 44, three driving toothed pulleys 45, 45m and a distribution belt 46. The mechanism is actuated by the driving drive pulley 45m (also visible in FIG. 3). The loose pulleys 44 help to guide and tension the distribution belt 46. The two pulleys 45 (also visible in FIG. 3) are driven in rotation by the drive pulley 45m and the belt 46 and communicate their rotational movements to two transmission rods 47, here of hexagonal section, which are inserted and mechanically fixed into hubs of the pulleys 45 (see FIG. 6).

As shown more particularly in FIG. 3, these two rods extend transversely over the length of the turnover structure 4 and are mechanically coupled with the belt driving drums 427H and 427L of the conveyors 42BH, 42AH and 42BL, 42AL by insertion through hubs with hexagonal bore with which the drums 427H and 427L are equipped (see FIG. 5).

Figure 7:
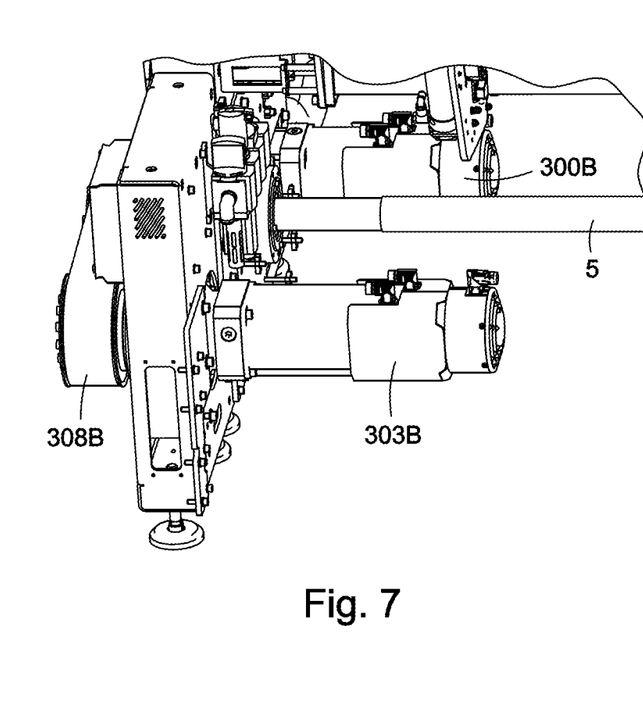
FIG. 7 is a partial perspective view showing motors and a torque transmission shaft incorporated in the module of FIG. 3.

The drive pulley 45m is actuated in rotation by a motor 300B shown in FIGS. 4B and 7. As shown in FIG. 4B, the rotational movement of the motor 300B is transmitted by a distribution belt 301B to a pulley 302B fixed onto one and the same rotary axial shaft as the drive pulley 45m.

The rotational driving of the turnover structure 4 is now described in detail hereinbelow with reference more particularly to FIGS. 3, 4A, 4B and 7.

According to the invention, the turnover structure 4 is driven in rotation from its two rotation shafts 400A, 400B housed in respective bearings (see 300A in FIG. 3) with which the pillars 30A, 30B are equipped, respectively. First and second mechanical torques are applied simultaneously to the shafts 400A and 400B, respectively, and provokes the rotation of the turnover structure 4.

The motor dedicated to the rotational actuation of the turnover structure 4 is shown in FIGS. 3 and 7 and is referenced 303B. The motor 303B rotationally drives a drive toothed pulley 304B, visible in FIGS. 3 and 4B. A mechanical driving mechanism comprising toothed pulleys 305B, 306B, 307B and first and second distribution belts 308B, 309B is provided between the drive pulley 304B and the rotation shaft 400B which is equipped with a flywheel 401B. The first distribution belt 308B transmits the drive torque supplied by the drive pulley 304B to the toothed pulley 306B. The second distribution belt 309B is mounted on the same toothed pulley 306B as the first distribution belt 308B, alongside the latter, and on another toothed pulley 307B and a flywheel 401B fixed to the rotation shaft 400B. A first part of the rotation torque supplied by the motor 303B is thus applied to the rotation shaft 400B of the turnover structure 4.

The toothed pulley 306B participates in the transmission of a second part of the rotation torque supplied by the motor 303B to the rotation shaft 400A of the turnover structure 4.

As shown in FIGS. 3 and 7, a transmission shaft 5 is provided whose function is to transmit the second part of the torque supplied by the motor 303B to a toothed pulley 301A (see FIG. 4A) which is mounted in the low part of the pillar 30A.

The transmission shaft 5 is fixed mechanically at its two ends onto respective hubs of the toothed pulleys 305B and 301A and transmits the second part of the torque supplied by the motor 303B to the toothed pulley 301A.

As shown in FIG. 4A, the rotation shaft 400A of the turnover structure 4 is equipped with a flywheel 302A around which is mounted a distribution belt 303A. The distribution belt 303A is mounted also on the toothed pulley 301A which supplies the second part of the drive torque transmitted via the transmission shaft 5. A loose toothed pulley 304A, that can be adjusted in position, is also provided to ensure an appropriate tensioning of the distribution belt 303A. The second part of the torque supplied by the motor 303B is applied by the means described above to the shaft 400A of the turnover structure 4 and participates in the rotational driving thereof.

Obviously, the invention is not limited to the particular embodiment which has been described here by way of example. Different variant embodiments will be able to be produced by those skilled in the art according to the applications concerned.

The turnover module according to the invention is described here in a particular embodiment which involves only a single motor supplying all of the rotation torque to the turnover structure, this torque being distributed over the two rotation shafts of the turnover structure using distribution means comprising the transmission shaft 5. Obviously, another embodiment could provide two synchronously-controlled motors, each of them being dedicated to the driving of a rotation shaft of the turnover structure.

The invention claimed is:
1. A double-transport-belt conveyor that can be incorporated in a folding package turnover module, comprising:

first and second single-transport-belt conveyor subassemblies arranged facing each other symmetrically relative to a pinching plane of a conveyor; and first and second sets of rollers incorporated respectively in the first and second single-transport-belt conveyor subassemblies and distributed on either side of the pinching plane over a length of transport of the conveyor, the first set of rollers guiding a first belt of the first single-transport-belt conveyor subassembly and the second set of rollers guiding a second belt of the second single-transport-belt conveyor subassembly, wherein the first and second single-transport-belt conveyor subassemblies respectively comprise first and second sets of vertically arranged jacks, the first and second sets of vertically arranged jacks being associated respectively with the first and second sets of rollers, each roller of the first and second sets of rollers being mounted on a dedicated respective jack, wherein adjustable and different pressures are applied, at a level of the pinching plane, to the first belt and the second belt respectively by the first and second sets of rollers and the first and second sets of vertically arranged jacks, and wherein a pressure applied to the first belt of the first single-transport-belt conveyor subassembly situated in a low position is greater than a pressure applied to the second belt of the second single-transport-belt conveyor subassembly situated in a high position.

2. The conveyor of claim 1, wherein the pressure applied to the first belt of the first single-transport-belt conveyor subassembly situated in the low position is adjusted according to a weight of folding packages traveling in the conveyor.

3. The conveyor of claim 1, wherein the pressure applied to the second belt of the second single-transport-belt conveyor subassembly situated in the high position is optimized to a minimum to ensure an adequate securing of folding packages without a risk of damage to a surface thereof.

4. The conveyor of claim 1, wherein the first and second sets of vertically arranged jacks are pneumatic jacks.

5. A folding package turnover module that can be incorporated in a folding package production line, comprising:

a frame having first and second vertical pillars; and a rotary turnover structure arranged horizontally between the vertical pillars, wherein the rotary turnover structure comprises at least one double-belt conveyor comprising:

first and second single-transport-belt conveyor subassemblies arranged facing each other symmetrically relative to a pinching plane of the double-belt conveyor; and first and second sets of rollers incorporated respectively in the first and second single-transport-belt conveyor subassemblies and distributed on either side of the pinching plane over a length of transport of the double-belt conveyor, the first set of rollers guiding a first belt of the first single-transport-belt conveyor subassembly and the second set of rollers guiding a second belt of the second single-transport-belt conveyor subassembly, wherein the first and second conveyor subassemblies respectively comprise first and second sets of vertically arranged jacks, the first and second sets of vertically arranged jacks being associated respectively with the first and second sets of rollers, each roller of the first and second sets of rollers being mounted on a dedicated respective jack, the at least one double-belt conveyor being arranged vertically, and wherein the rotary turnover structure further comprises a horizontal axis of rotation defined between the first and second vertical pillars, the horizontal axis of rotation passing through the pinching plane of the first and second single-transport-belt conveyor subassemblies of the rotary turnover structure, the horizontal axis of rotation being at right angles to vertical planes of the first and second single-transport-belt conveyor subassemblies and to a direction of transport of the folding package.

6. The folding package turnover module of claim 5, wherein the rotary turnover structure further comprises:

at least two double-belt conveyors, the at least two double-belt conveyors being arranged vertically; and means for adjusting distance between two respective vertical planes of the at least two double-belt conveyors.

7. The folding package turnover module of claim 5, further comprising first and second motors dedicated respectively to rotationally driving the rotary turnover structure and to driving the first belt and the second belt of the first and second single-transport-belt conveyor subassemblies.

8. The folding package turnover module of claim 7, comprising additional means, the additional means comprising at least one pulley, at least one distribution belt and at least one transmission rod for mechanically coupling the second motor to driving drums of the first belt and the second belt of the first and second single-transport-belt conveyor subassemblies.

9. A folding package production line comprising a folding-gluing machine, a counting-segmentation module, a turnover module and a set of conveyors, wherein the turnover module is a folding package turnover module as claimed in claim 5 for turning over folding packages.

* * * * *